US012628025B2

(12) United States Patent
He et al.

(10) Patent No.: US 12,628,025 B2
(45) Date of Patent: May 12, 2026

(54) PRIORITY SETTING FOR QUALITY OF EXPERIENCE

(71) Applicant: Nokia Technologies Oy, Espoo (FI)

(72) Inventors: Jing He, Beijing (CN); Malgorzata Tomala, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 311 days.

(21) Appl. No.: 18/559,222

(22) PCT Filed: May 10, 2021

(86) PCT No.: PCT/CN2021/092706
§ 371 (c)(1),
(2) Date: Nov. 6, 2023

(87) PCT Pub. No.: WO2022/236557
PCT Pub. Date: Nov. 17, 2022

(65) Prior Publication Data
US 2024/0236745 A1 Jul. 11, 2024

(51) Int. Cl.
*H04W 24/10* (2009.01)
*H04W 24/02* (2009.01)
*H04W 24/08* (2009.01)

(52) U.S. Cl.
CPC ........... *H04W 24/10* (2013.01); *H04W 24/02* (2013.01); *H04W 24/08* (2013.01)

(58) Field of Classification Search
CPC ..... H04W 24/10; H04W 24/02; H04W 24/08; H04L 41/5067; H04L 43/06
See application file for complete search history.

(56) References Cited

U.S. PATENT DOCUMENTS 12,041,490 B2 * 7/2024 Johansson .............. H04W 24/00
12,375,370 B2 * 7/2025 Eklöf .................. H04L 41/0806
(Continued)

FOREIGN PATENT DOCUMENTS

| AU | 2021438351 B2 * | 5/2025 | ............. H04W 80/12 |
| AU | 2022473505 B2 * | 11/2025 | .............. H04W 8/22 |

(Continued)

OTHER PUBLICATIONS

Extended European Search Report received for corresponding European Patent Application No. 21941133.7, dated Dec. 10, 2024, 10 pages.

(Continued)

*Primary Examiner* — Michael A Keller
(74) *Attorney, Agent, or Firm* — McCarter & English LLP

(57) ABSTRACT

Embodiments of the present disclosure relate to devices, methods, apparatuses and computer readable storage media of priority setting for Quality of Experience (QoE). The method comprises receiving, from a second device, an indication associated with reporting at least one QoE measurement to be performed at the first device, the indication generated by the second device based on respective priorities of the at least one QoE measurement and determining the reporting of the at least one QoE measurement based on the indication. In this way, the gNB have capability to control configured QoE measurement reporting of the UE and the QoE reporting of the UE with high priority can be maintained without interruption in low-level and middle-level overload situation.

20 Claims, 6 Drawing Sheets

(56) References Cited

U.S. PATENT DOCUMENTS

| | | | | |
|---|---|---|---|---|
| 12,445,888 | B2 * | 10/2025 | Lunardi | H04W 28/0284 |
| 12,470,969 | B2 * | 11/2025 | Liu | H04W 24/10 |
| 12,506,667 | B2 * | 12/2025 | Centonza | H04L 41/5067 |
| 2013/0035085 | A1 | 2/2013 | Axell et al. | |
| 2020/0092762 | A1 * | 3/2020 | Shi | H04W 36/0044 |
| 2021/0385691 | A1 * | 12/2021 | Johansson | H04W 24/00 |
| 2022/0046503 | A1 * | 2/2022 | Kumar | H04W 28/24 |
| 2023/0038867 | A1 * | 2/2023 | Tsai | H04W 28/0215 |
| 2023/0043510 | A1 * | 2/2023 | Tsai | H04W 28/0247 |
| 2023/0116324 | A1 * | 4/2023 | Eklöf | H04W 24/10 |
| | | | | 370/331 |
| 2023/0199543 | A1 * | 6/2023 | Zhang | H04W 72/231 |
| | | | | 370/252 |
| 2023/0231779 | A1 * | 7/2023 | Centonza | H04L 41/5067 |
| | | | | 370/252 |
| 2023/0308942 | A1 * | 9/2023 | Zhang | H04L 41/5067 |
| 2023/0319616 | A1 * | 10/2023 | Lunardi | H04W 28/0284 |
| | | | | 370/329 |
| 2024/0056872 | A1 * | 2/2024 | Parichehrehteroujeni | |
| | | | | H04L 41/0806 |
| 2024/0064550 | A1 * | 2/2024 | Liu | H04L 41/5067 |
| 2024/0107358 | A1 * | 3/2024 | Liu | H04L 43/065 |
| 2024/0137294 | A1 * | 4/2024 | Choi | H04W 24/10 |
| 2024/0154880 | A1 * | 5/2024 | Jeong | H04L 41/5067 |
| 2024/0224102 | A1 * | 7/2024 | Zhang | H04L 41/5067 |
| 2024/0235964 | A9 * | 7/2024 | Choi | H04W 24/10 |
| 2024/0236745 | A1 * | 7/2024 | He | H04W 24/08 |
| 2025/0024287 | A1 * | 1/2025 | Tan | H04L 43/065 |
| 2025/0062972 | A1 * | 2/2025 | He | H04W 28/0278 |
| 2025/0062973 | A1 * | 2/2025 | Zhang | H04W 28/0268 |
| 2025/0168680 | A1 * | 5/2025 | Liu | H04W 24/10 |
| 2025/0234225 | A1 * | 7/2025 | He | H04W 24/10 |
| 2025/0240225 | A1 * | 7/2025 | Bergström | H04W 24/10 |
| 2025/0286796 | A1 * | 9/2025 | Báder | H04L 43/062 |
| 2025/0374101 | A1 * | 12/2025 | He | H04W 24/08 |

FOREIGN PATENT DOCUMENTS

| | | | | | |
|---|---|---|---|---|---|
| CA | 3205711 | A1 * | 9/2022 | | H04L 41/5067 |
| CA | 3214011 | A1 * | 10/2022 | | H04W 24/10 |
| CN | 112351442 | A | 2/2021 | | |
| CN | 115314932 | A * | 11/2022 | | H04W 24/10 |
| CN | 115314934 | A * | 11/2022 | | H04L 41/5067 |
| CN | 115918131 | A * | 4/2023 | | H04W 24/08 |
| CN | 116636245 | A * | 8/2023 | | H04L 43/062 |
| CN | 116888943 | A * | 10/2023 | | H04L 65/80 |
| CN | 117121555 | A * | 11/2023 | | H04W 36/0072 |
| CN | 118542022 | A * | 8/2024 | | H04W 28/0278 |
| CN | 118786698 | A * | 10/2024 | | H04W 28/0268 |
| CN | 119156803 | A * | 12/2024 | | H04L 43/065 |
| CN | 119698871 | A * | 3/2025 | | H04W 24/10 |
| CN | 119968882 | A * | 5/2025 | | H04L 41/5067 |
| CN | 119999276 | A * | 5/2025 | | H04L 41/5067 |
| CN | 120052015 | A * | 5/2025 | | H04W 52/0206 |
| CN | 120052020 | A * | 5/2025 | | H04W 76/15 |
| CN | 115314934 | B | 6/2025 | | H04L 41/5067 |
| CN | 120226321 | A * | 6/2025 | | H04W 24/10 |
| CN | 120322995 | A * | 7/2025 | | H04W 24/10 |
| CN | 120898466 | A * | 11/2025 | | H04W 24/10 |
| CN | 121040129 | A * | 11/2025 | | H04W 36/0083 |
| CN | 121080024 | A * | 12/2025 | | H04W 24/10 |
| CN | 121176057 | A * | 12/2025 | | H04W 24/10 |
| EP | 2779718 | A1 * | 9/2014 | | H04W 24/08 |
| EP | 3665948 | B1 * | 3/2022 | | H04W 36/08 |
| EP | 4171109 | A1 * | 4/2023 | | H04W 8/24 |
| EP | 4284054 | A1 | 11/2023 | | |
| EP | 4336893 | A1 * | 3/2024 | | H04L 41/5067 |
| EP | 4340437 | A1 * | 3/2024 | | H04W 24/10 |
| EP | 3874790 | B1 * | 7/2025 | | H04W 28/0284 |
| EP | 4298775 | B1 * | 10/2025 | | H04W 24/10 |
| GB | 2608259 | A * | 12/2022 | | H04W 76/34 |
| JP | 2017-163336 | A | 9/2017 | | |
| JP | 2022543150 | A * | 10/2022 | | H04W 24/04 |
| JP | 2023525836 | A * | 6/2023 | | H04W 24/08 |
| JP | 2024502554 | A * | 1/2024 | | H04W 8/24 |
| JP | 2024507962 | A * | 2/2024 | | H04L 65/80 |
| JP | 2024538554 | A * | 10/2024 | | H04W 24/02 |
| JP | 7581379 | B2 * | 11/2024 | | H04W 24/10 |
| JP | 7695383 | B2 * | 6/2025 | | H04W 80/12 |
| JP | 2025526025 | A * | 8/2025 | | H04W 8/22 |
| JP | 2025526664 | A * | 8/2025 | | H04L 41/5067 |
| JP | 2025528482 | A * | 8/2025 | | H04W 24/04 |
| JP | 2025134741 | A * | 9/2025 | | H04W 80/12 |
| JP | 2025533615 | A * | 10/2025 | | H04L 41/5067 |
| KR | 20220136810 | A * | 10/2022 | | H04W 76/27 |
| KR | 20230129273 | A * | 9/2023 | | H04W 8/24 |
| KR | 20230151521 | A * | 11/2023 | | H04L 41/5067 |
| KR | 20230165293 | A * | 12/2023 | | H04W 24/10 |
| KR | 20240090218 | A * | 6/2024 | | H04W 8/24 |
| KR | 20250049348 | A * | 4/2025 | | H04L 41/5067 |
| KR | 20250065869 | A * | 5/2025 | | H04L 41/5067 |
| KR | 20250108699 | A * | 7/2025 | | H04W 52/0206 |
| KR | 20260004432 | A * | 1/2026 | | H04W 36/0085 |
| WO | WO-2013067820 | A1 * | 5/2013 | | H04W 24/08 |
| WO | 2018/142345 | A1 | 8/2018 | | |
| WO | 2019/010606 | A1 | 1/2019 | | |
| WO | WO-2019030737 | A1 * | 2/2019 | | H04W 36/0044 |
| WO | WO-2020128657 | A1 * | 6/2020 | | H04W 28/24 |
| WO | WO-2021028397 | A1 * | 2/2021 | | H04W 28/0942 |
| WO | WO-2021228095 | A1 * | 11/2021 | | H04W 28/24 |
| WO | WO-2021242156 | A1 * | 12/2021 | | H04W 24/10 |
| WO | WO-2022005356 | A1 * | 1/2022 | | H04W 24/08 |
| WO | WO-2022005376 | A1 * | 1/2022 | | H04W 28/0289 |
| WO | WO-2022005379 | A1 * | 1/2022 | | H04W 24/10 |
| WO | WO-2022081063 | A1 * | 4/2022 | | H04W 24/10 |
| WO | WO-2022086385 | A1 * | 4/2022 | | H04L 43/062 |
| WO | WO-2022086386 | A1 * | 4/2022 | | H04L 43/062 |
| WO | WO-2022151282 | A1 * | 7/2022 | | H04W 36/0088 |
| WO | WO-2022154713 | A1 * | 7/2022 | | H04W 8/24 |
| WO | WO-2022170582 | A1 * | 8/2022 | | H04W 24/10 |
| WO | WO-2022180619 | A1 * | 9/2022 | | H04L 65/80 |
| WO | WO-2022183375 | A1 * | 9/2022 | | H04L 41/5067 |
| WO | WO-2022204950 | A1 * | 10/2022 | | H04W 36/0072 |
| WO | WO-2022204988 | A1 * | 10/2022 | | H04W 24/02 |
| WO | WO-2022205278 | A1 * | 10/2022 | | H04W 24/10 |
| WO | WO-2022205354 | A1 * | 10/2022 | | H04W 24/08 |
| WO | WO-2022211695 | A1 * | 10/2022 | | H04L 43/06 |
| WO | WO-2022217477 | A1 * | 10/2022 | | H04W 24/08 |
| WO | WO-2022236557 | A1 * | 11/2022 | | H04W 24/08 |
| WO | WO-2022237602 | A1 * | 11/2022 | | H04L 41/5067 |
| WO | WO-2022240185 | A1 * | 11/2022 | | H04L 41/5067 |
| WO | WO-2022257103 | A1 * | 12/2022 | | H04W 24/10 |
| WO | WO-2023068996 | A1 * | 4/2023 | | H04W 24/10 |
| WO | WO-2022086385 | A9 * | 5/2023 | | H04L 43/062 |
| WO | WO-2023115280 | A1 * | 6/2023 | | H04W 28/0289 |
| WO | WO-2023133812 | A1 * | 7/2023 | | H04W 28/0278 |
| WO | WO-2023156915 | A1 * | 8/2023 | | H04W 24/10 |
| WO | WO-2023205945 | A1 * | 11/2023 | | H04W 28/0284 |
| WO | WO-2023223081 | A1 * | 11/2023 | | H04W 24/10 |
| WO | WO-2024016340 | A1 * | 1/2024 | | H04W 28/0268 |
| WO | WO-2024031281 | A1 * | 2/2024 | | H04L 41/5067 |
| WO | WO-2024031283 | A1 * | 2/2024 | | H04L 41/5067 |
| WO | WO-2024031475 | A1 * | 2/2024 | | H04L 43/065 |
| WO | WO-2024033773 | A1 * | 2/2024 | | H04L 41/5067 |
| WO | WO-2024043818 | A1 * | 2/2024 | | H04L 41/5067 |
| WO | WO-2024065754 | A1 * | 4/2024 | | H04L 41/5067 |
| WO | WO-2024069419 | A1 * | 4/2024 | | H04W 24/10 |
| WO | WO-2024092799 | A1 * | 5/2024 | | H04W 24/10 |
| WO | WO-2024093097 | A1 * | 5/2024 | | H04W 24/10 |
| WO | WO-2024103228 | A1 * | 5/2024 | | H04W 52/0206 |
| WO | WO-2024119439 | A1 * | 6/2024 | | H04W 24/10 |
| WO | WO-2024220017 | A1 * | 10/2024 | | H04W 24/10 |
| WO | WO-2024227299 | A1 * | 11/2024 | | H04W 36/0083 |
| WO | WO-2024229707 | A1 * | 11/2024 | | H04W 36/00 |
| WO | WO-2024229852 | A1 * | 11/2024 | | H04W 24/10 |
| WO | WO-2024239216 | A1 * | 11/2024 | | H04W 24/10 |

OTHER PUBLICATIONS

"Reply LS on adding new service type in QMC reporting", 3GPP TSG-RAN WG6 Meeting #6, R6-170518, RAN6, Nov. 27-Dec. 1, 2017, 1 page.

(56) References Cited

OTHER PUBLICATIONS

"Stop and start of QoE measurement reporting", 3GPP TSG-RAN WG2 Meeting #113bis-e, R2-212967, Agenda: 8.14, Qualcomm Incorporated, Apr. 12-20, 2021, 4 pages.

Office action received for corresponding Chinese Patent Application No. 202180005279.0, dated May 29, 2025, 8 pages of office action and 7 pages of translation available.

"Further Discussions on the Remaining Open Issues of Support Slice for QoE", 3GPP TSG-RAN WG3 Meeting #111-e, R3-210864, Agenda: 15.2, Huawei, Jan. 25-Feb. 5, 2021, 6 pages.

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Radio Access Network; NR; User Equipment (UE) radio access capabilities (Release 16)", 3GPP TS 38.306, V16.4.0, Mar. 2021, pp. 1-151.

"3rd Generation Partnership Project; Technical Specification Group Radio Access Network; NG-RAN; NG Application Protocol (NGAP) (Release 16)", 3GPP TS 38.413, V16.5.0, Apr. 2021, pp. 1-473.

"New WID on NR QoE management and optimizations for diverse services", 3GPP TSG RAN Meeting #91-e, RP-210913, Agenda: 9.1.3, China Unicom, Mar. 16-26, 2021, 5 pages.

"3rd Generation Partnership Project; Technical Specification Group Radio Access Network; Study on NR QoE (Quality of Experience) management and optimizations for diverse services (Release 17)", 3GPP TR 38.890, V17.0.0, Apr. 2021, pp. 1-18.

"TP for TR update (RAN2)", 3GPP TSG-RAN WG2 Meeting #113-e, R2-2102483, Agenda: 8.14, China Unicom, Jan. 25-Feb. 5, 2021, 5 pages.

"General framework for QoE measurements", 3GPP TSG-RAN WG2#113b-e Meeting, R2-2103934, Agenda: 8.14, Samsung, Apr. 12-20, 2021, 3 pages.

International Search Report and Written Opinion received for corresponding Patent Cooperation Treaty Application No. PCT/CN2021/092706, dated Feb. 10, 2022, 9 pages.

"PCR for TR 38.8xx: NR QoE Measurement Triggering, Configuration, Collection and Reporting", 3GPP TSG-RAN WG3 Meeting #109-e, R3-205201, Agenda: 15.2, Ericsson, Aug. 17-27, 2020, pp. 1-6.

* cited by examiner

PRIORITY SETTING FOR QUALITY OF EXPERIENCE

RELATED APPLICATION

This application claims priority to PCT Application No. PCT/CN2021/092706 filed May 10, 2021, which is incorporated herein by reference in its entirety.

FIELD

Embodiments of the present disclosure generally relate to the field of telecommunication and in particular to devices, methods, apparatuses and computer readable storage media of priority setting for Quality of Experience (QoE).

BACKGROUND

The QoE may reflect the satisfaction of the users to the service providers. The measurement of QoE is performed by the application layer of the User Equipment (UE), which may refer to a service type. The configuration for the QoE measurement can be specified for the UE.

There are two QoE procedures proposed for New Radio (NR), namely signalling-based procedure and management-based procedure. In the signalling-based procedure, the Core Network (CN) may initiate the activation of the QoE measurement configured by an Operation and Maintenance (OAM) entity and send the QoE measurement configuration to the gNB. In management-based procedure, the OAM entity may send the QoE measurement configuration to the gNB.

SUMMARY

In general, example embodiments of the present disclosure provide a solution of priority setting for QoE.

In a first aspect, there is provided a first device. The first device comprises at least one processor; and at least one memory including computer program codes; the at least one memory and the computer program codes are configured to, with the at least one processor, cause the first device at least to receive, from a second device, an indication associated with reporting at least one QoE measurement to be performed at the first device, the indication generated by the second device based on respective priorities of the at least one QoE measurement; and determine the reporting of the at least one QoE measurement based on the indication.

In a second aspect, there is provided a second device. The second device comprises at least one processor; and at least one memory including computer program codes; the at least one memory and the computer program codes are configured to, with the at least one processor, cause the second device at least to generate an indication associated with reporting at least one QoE measurement to be performed at a first device based on respective priorities of the at least one QoE measurement and transmit the indication to the first device.

In a third aspect, there is provided a method. The method comprises receiving, from a second device, an indication associated with reporting at least one QoE measurement to be performed at the first device, the indication generated by the second device based on respective priorities of the at least one QoE measurement and determining the reporting of the at least one QoE measurement based on the indication.

In a fourth aspect, there is provided a method. The method comprises generating an indication associated with reporting at least one QoE measurement to be performed at a first device based on respective priorities of the at least one QoE measurement and transmitting the indication to the first device.

In a fifth aspect, there is provided an apparatus comprising means for receiving, from a second device, an indication associated with reporting at least one QoE measurement to be performed at the first device, the indication generated by the second device based on respective priorities of the at least one QoE measurement and means for determining the reporting of the at least one QoE measurement based on the indication.

In a sixth aspect, there is provided an apparatus comprising means for generating an indication associated with reporting at least one QoE measurement to be performed at a first device based on respective priorities of the at least one QoE measurement and means for transmitting the indication to the first device.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
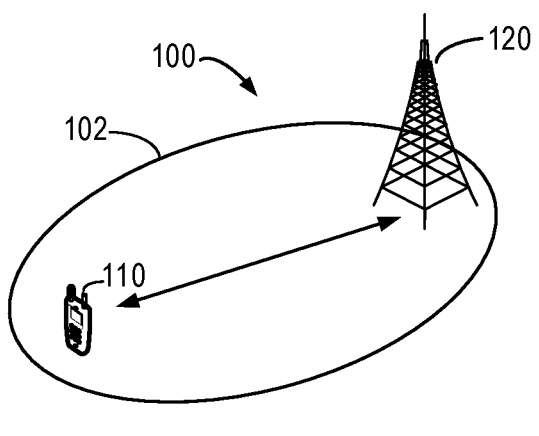
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IOT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 may comprise a terminal device 110 (hereinafter may also be referred to as a UE 110 or a first device 110). The communication network 100 may further comprise a network device 120 (hereinafter may also be referred to as a gNB 120 or a second device 120). The network device 120 can manage a cell 102. The terminal device 110 and network device 120 can communicate with each other in the coverage of the cell 102.

It is to be understood that the number of network devices and terminal devices shown in FIG. 1 is given for the purpose of illustration without suggesting any limitations. The communication network 100 may include any suitable number of network devices and terminal devices.

As mention above, the QoE procedure in NR may refers to signalling-based procedure and management-based procedure.

In the signalling-based procedure, the Core Network (CN) may initiate the activation of the QoE measurement configured by an Operation and Maintenance (OAM) entity and send the QoE measurement configuration to the gNB. The gNb may further forward the QoE measurement configuration towards the specific UE via RRC signalling. UE Access Stratum (AS) layer shall send the QoE measurement configuration to UE application layer.

In management-based procedure, the OAM entity may send the QoE measurement configuration to the gNB. The gNB may find multiple qualified UEs that meet the criteria (e.g. area scope, application layer capability, service type, etc.) or a single specific UE. The gNB may further send the QoE measurement configuration to the AS layer of the specific UE or each qualified UE. The UE AS layer shall send the QoE measurement configuration to UE application layer.

In NR, the QoE measurement configuration may still be assumed to be carried in AS container from gNB to the UE AS layer. The configuration will be passed in DL RRC message "RRCReconfiguration" with QoE measurements triggers included in AS container that are transparent for gNB and the UE AS layer. There can be multiple measurements configured simultaneously to the UE.

In a case where the gNB is in the overload situation, to relieve overload in air interface, the gNB may stop new QoE measurement configurations, release existing QoE measurement configurations and/or temporarily pause QoE measurement reporting. The QoE Configuration applicability to different RRC states brings additional complexities in handling unexpected application layer reports to the UE AS layer. In worst case, the RRC connection of the UE is released, the application layer of the UE may generate storm of reports with reporting intervals, with no possibility to pass the reports to the gNB due to lack of active RRC connection or paused RRC reporting. Currently neither UE AS nor the gNB has control on the incoming unexpected application layer reporting.

Furthermore, it has been agreed that one UE can be configured to perform multiple simultaneous QoE measurements and to report the corresponding result of the measurements, which also means that multiple QoE measurements will be configured in one cell. However, the gNB may not determine how to pause/resume QoE measurement reporting in context of multiple simultaneous configurations. The RRC Release or SRB4 release may imply hard stop of any QoE measurements reporting. While temporary pause concept is not defined yet.

Therefore, it is expected that some configured QoE measurement reporting can be maintained in such as middle-level overload situation as these QoE measurements are important than others. It is also expected that the gNB have capability to control configured QoE measurement reporting in one cell one by one. For example, the RRC connection of one QoE measurement with low priority can be released firstly. When the gNB is out of the overload situation, the gNB can resume one configured QoE measurement reporting with high priority firstly.

The present disclosure provides solutions of priority setting for QoE. In this solution, the UE may receive an indication associated with reporting at least one QoE measurement to be performed at the first device from the gNB, which is generated by the gNB based on respective priorities of the at least one QoE measurement. Based on the indication, the UE may determine the reporting of the at least one QoE measurement based on the indication. In this way, the gNB have capability to control configured QoE measurement reporting of the UE in the overload situation and the QoE reporting of the UE with high priority can be maintained without interruption in low-level and middle-level overload situation.

Principle and implementations of the present disclosure will be described in detail below with reference to FIGS. 2-4, which show schematic processes of priority setting for QoE. For the purpose of discussion, the processes 200-400 will be described with reference to FIG. 1. The processes 200-400 may involve the UE 110 and the gNB 120 as illustrated in FIG. 1.

The gNB 120 may obtain information about respective priorities of at least one QoE measurement to be performed by the UE 110 from a CN node or an OAM entity. As an option, the information about respective priorities of at least one QoE measurement can be obtained by the gNB 120 along with the configuration parameters configured for the at least one QoE measurement from the CN node or the OAM entity. It is to be understood that the information about respective priorities of at least one QoE measurement can be transmitted from the CN node or the OAM entity to the gNB 120 by a separate message. Alternatively, the information about respective priorities of at least one QoE measurement may also be requested by gNB 120 from the CN node or the OAM entity. For example, the gNB 120 may send a request of respective priorities of at least one QoE measurement to the CN node or the OAM entity.

Figure 2:
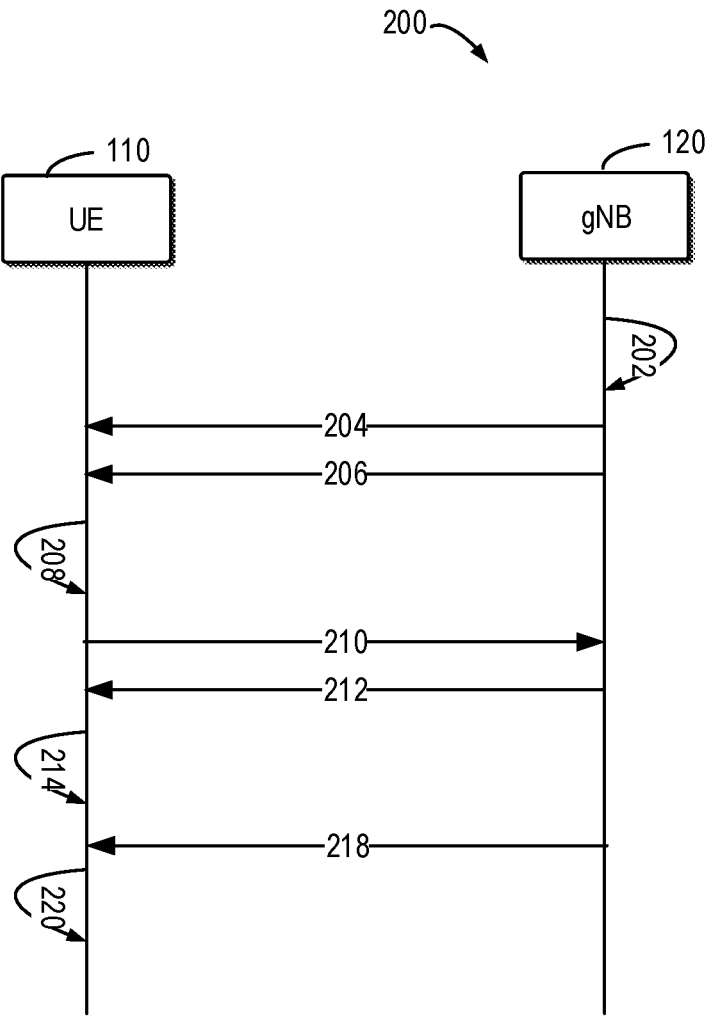
FIG. 2 shows a signaling chart illustrating a process of priority setting for QoE according to some example embodiments of the present disclosure.

As shown in FIG. 2, the gNB 120 may generate 202 an indication for the UE 110 to report the at least one QoE measurement based on the obtained information about respective priorities of at least one QoE measurement. Then the gNB 120 may transmit 204 the indication to the UE 110. The indication can be transmitted to the UE 110 when the gNB 120 forwards the configuration parameters configured for the at least one QoE measurement to the UE 110. Alternatively, the gNB 120 may also transmit the indication individually.

Based on the indication, the UE 110 may obtain the information about respective priorities of at least one QoE measurement. The UE 110 may store the respective priorities of at least one QoE measurement.

In normal situation, the UE 110 may perform the at least one QoE measurement based on the configured measurement parameters and report the at least one QoE measurement to the gNB 120.

When the gNB 120 determines that the air interface between the gNB 120 and the UE 110 is overload, the gNB 120 may determine a first overload level and transmit 206 an indication of the first overload level to the UE 110.

Based on the overload level, the UE 110 may determine a first threshold priority for the first overload level. The association between the overload levels and multiple threshold priorities can be pre-configured to the UE 110. Alternatively, the association may also be transmitted from the gNB 120 to the UE 110 along with the priority information of the at least one QoE measurement. It is to be understood that the association can be transmitted from gNB 120 to the UE 110 by a separate message. For example, the message can be a SIB, or a RRC dedicated message.

If the UE 110 determines that respective priorities of a first set of QoE measurements in the at least one QoE measurement are lower than the determined first threshold priority, the UE 110 may stop, pause or suspend 208 reporting the first set of the QoE measurements. Hereinafter "suspend reporting a QoE measurement" may be considered that the reporting of the QoE measurement can be temporary stopped or paused. The UE 110 may report 210 the other QoE measurements in the at least one QoE measurement except for the first set of QoE measurements.

In a case where the gNB 120 determines that the overload situation does not recover, the gNB 120 may transmit 212 an indication of a second overload level to the UE 110. The UE 110 may determine a second threshold priority for the second overload level, which can be higher than the first threshold priority.

Then the UE 110 may stop, pause or suspend 214 reporting a second set of the QoE measurements in the at least one QoE measurement. The respective priorities of second set of the QoE measurements may be higher than the first threshold priority and lower than the second threshold priority.

If the gNB 120 determines that the overload situation recovers, the gNB 120 may update the overload level. For example, the gNB 120 may transmit 218 an indication of the first overload level to the UE 110. Then the UE 110 may resume 220 reporting the QoE measurements which have respective priorities higher than the first threshold priority. For example, the UE 110 may resume the second set of the QoE measurements.

In some example embodiments, for those QoE measurements that have been stopped or suspended reporting, the UE 110 may determine whether the results of those QoE measurements should be logged or discard based on the respective priorities of the stopped or suspended QoE measurements.

For example, as describes above, the first set of QoE measurements and the second set of QoE measurements have been stopped, paused or suspended reporting. The UE 110 may log the results of the second set of QoE measurements and discard the results of the first set of QoE measurements, because the respective priorities of the second set of QoE measurements are higher than those of the first set of QoE measurements.

In some example embodiments, if the UE 110 determines that the overload situation of the gNB 120 changes, for example, the UE 110 determines that the reporting the second set of QoE measurements can be resumed, the UE 110 may determine whether histories results of the second set of QoE measurements are logged at the UE 110. If the UE 110 determines that the logged histories results of the second set of QoE measurements exist, the UE 110 may report the logged histories results to the gNB 120.

It is to be understood that if respective histories results of more than one QoE measurements has logged, the UE 110 may report one by one in priority order of respective priorities of the more than one QoE measurements.

In some example embodiments, the indication of multiple overload level can be transmitted from the gNB 120 to the UE 110 via an RRC signalling. Alternatively, the indication can also be transmitted from the gNB 120 to the UE 110 via a System Information Block (SIB) by broadcasting. It is to be understood that any other suitable signalling can also carry the transmission of the indication.

Figure 3:
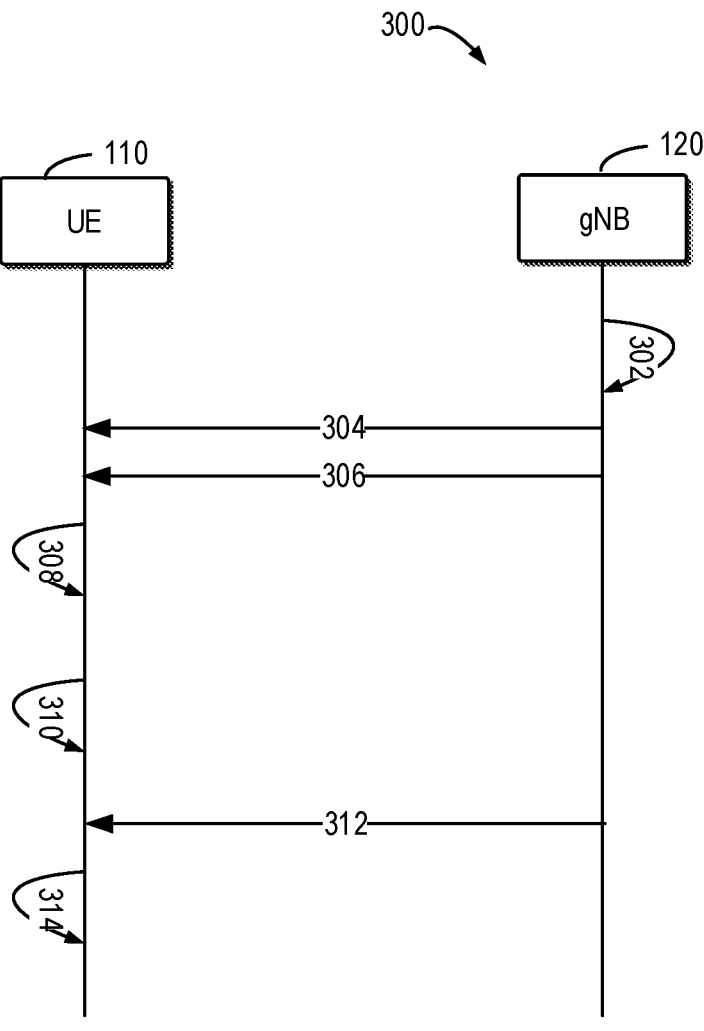
FIG. 3 shows a signaling chart illustrating a process of priority setting for QoE according to some example embodiments of the present disclosure.

FIG. 3 shows a further schematic process of priority setting for QoE. Similar with the process shown in FIG. 2, the gNB 120 may generate 302 an indication for the UE 110 to report the at least one QoE measurement based on the obtained information about respective priorities of at least one QoE measurement and transmit 304 the indication to the UE 110.

In this case, the gNB 120 may transmit 306 an indication of a timer for the UE to detect the overload status of the gNB 120. The timer may indicate a time interval within which the UE 110 may determine whether an indication of the overload status of the gNB 120 is received from the gNB 120.

In some example embodiments, the indication of the timer can be transmitted from the gNB 120 to the UE 110 via an RRC signalling. Alternatively, the indication can also be transmitted from the gNB 120 to the UE 110 via a SIB by broadcasting. It is to be understood that any other suitable signalling can also carry the transmission of the indication.

The UE 110 may detect whether an indication of the overload status of the gNB 120 is received from the gNB 120 by starting the timer. If the UE 110 determines that the overload status is detected before the timer expires, the UE 110 may stop or suspend 308 reporting the first set of the QoE measurements in the at least one QoE measurement. The respective priorities of first set of the QoE measurements may be lower than a first threshold priority corresponding to the overload status.

The detection of the overload status of the gNB 120 can be performed periodically based on the timer. In some example embodiments, the UE 110 may further detect whether an indication of the overload status of the gNB 120 is received from the gNB 120 by restarting the timer. If the UE 110 fails to detect the overload status is detected before the timer expires, the UE 110 may resume 310 the first set of the QoE measurements that have been stopped or suspended reporting.

Alternative, if the UE 110 still receives 312 an indication of the overload status from the gNB 120 before the timer expires, which means the overload status of gNB 120 does not get better after stop or suspend reporting the first set of the QoE measurements, the UE 110 may stop or suspend 314 reporting a second set of the QoE measurements in the at least one QoE measurement. The respective priorities of second set of the QoE measurements may be higher than the first threshold priority and lower than the second threshold priority.

Similarly, for those QoE measurements that have been stopped or suspended reporting, the UE 110 may determine whether the results of those QoE measurements should be logged or discard based on the respective priorities of the stopped or suspended QoE measurements.

For example, as describes above, the first set of QoE measurements and the second set of QoE measurements have been stopped or suspended reporting. The UE 110 may log the results of the second set of QoE measurements and discard the results of the first set of QoE measurements, because the respective priorities of the second set of QoE measurements are higher than those of the first set of QoE measurements.

In some example embodiments, if the UE 110 determines that the overload status of the gNB 120 is removed, for example, the UE 110 determines that the reporting the second set of QoE measurements can be resumed, the UE 110 may determine whether histories results of the second set of QoE measurements are logged at the UE 110. If the UE 110 determines that the logged histories results of the second set of QoE measurements exist, the UE 110 may report the logged histories results to the gNB 120.

It is to be understood that if respective histories results of more than one QoE measurements has logged, the UE 110 may report one by one in priority order of respective priorities of the more than one QoE measurements.

In some example embodiments, the indication of overload status can be transmitted from the gNB 120 to the UE 110 via a RRC signalling. Alternatively, the indication can also be transmitted from the gNB 120 to the UE 110 via a System Information Block (SIB) by broadcasting. It is to be understood that any other suitable signalling can also carry the transmission of the indication.

Figure 4:
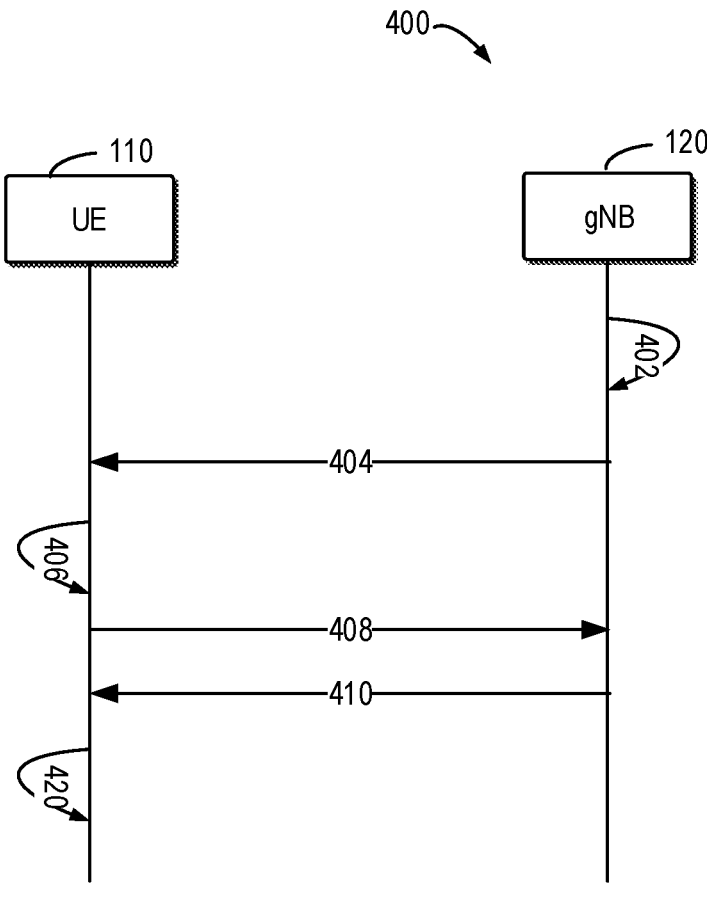
FIG. 4 shows a signaling chart illustrating a process of priority setting for QoE according to some example embodiments of the present disclosure.

Now the reference made to FIG. 4, which shows yet another schematic process of priority setting for QoE.

In this case, the gNB 120 may configure 402 respective priorities of at least one QoE measurement to be performed by the UE 110.

When the gNB 120 determines that the air interface between the gNB 120 and the UE 110 is overload, the gNB 120 may determine a configuration for the UE 110 to report the at least one QoE measurement based on the configured respective priorities.

For example, the gNB 120 may determine a first set of QoE measurements in the at least one QoE measurement that are not to be reported and/or a second set of QoE measurements in the at least one QoE measurement that are allowed to be reported based on the respective priorities of the at least one QoE measurement.

In some example embodiments, the gNB 120 may determine the identifiers of the first and the second set of QoE measurements and generate the configuration based on the identifiers.

Alternatively, the gNB 120 may also determine the services types of the first and the second set of QoE measurements and generate the configuration based on the services types.

The gNB 120 may transmit the 404 the configuration to the UE 110. After receiving the configuration, the UE 110 may stop or suspend 406 reporting the first set of QoE measurements and continue reporting 408 the second set of QoE measurements.

When the gNB 120 determines that the overload situation recovers, the gNB 120 may update the configuration for the UE 110 to report the at least one QoE measurement based on the configured respective priorities. For example, the gNB 120 may determine that the first set of QoE measurements, which have been stopped or suspended, are allowed to be reported and update the configuration based on the decision.

After the UE 110 receives 410 the updated configuration, the UE 110 may resume 420 the reporting the first set of QoE measurements.

Similarly, for those QoE measurements that have been stopped or suspended reporting, the UE 110 may determine whether the results of those QoE measurements should be logged or discard based on the respective priorities of the stopped or suspended QoE measurements.

Also when the UE 110 determines that the overload situation of the gNB 120 changes, for example, the UE 110 determines that the reporting the first set of QoE measurements can be resumed, the UE 110 may determine whether histories results of the first set of QoE measurements are logged at the UE 110. If the UE 110 determines that the logged histories results of the first set of QoE measurements exist, the UE 110 may report the logged histories results to the gNB 120.

In this way, the gNB have capability to control configured QoE measurement reporting of the UE and the QoE reporting of the UE with high priority can be maintained without interruption in low-level and middle-level overload situation.

Figure 5:
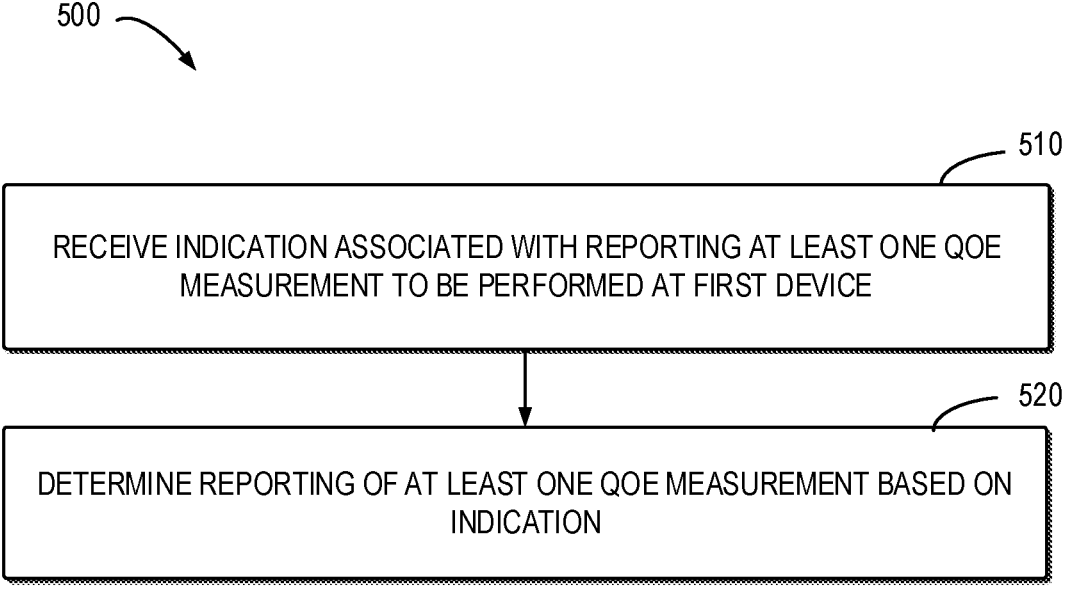
FIG. 5 shows a flowchart of an example method of priority setting for QoE according to some example embodiments of the present disclosure.

FIG. 5 shows a flowchart of an example method 500 of priority setting for QoE according to some example embodiments of the present disclosure. The method 500 can be implemented at the first device 110 as shown in FIG. 1. For the purpose of discussion, the method 500 will be described with reference to FIG. 1.

At 510, the first device receives, from a second device, an indication associated with reporting at least one Quality of Experience, QoE, measurement to be performed at the first device, the indication generated by the second device based on respective priorities of the at least one QoE measurement.

In some example embodiments, the first device may receive information of the respective priorities of the at least one QoE measurement from the second device.

In some example embodiments, the first device may receive a configuration for reporting at least one QoE measurement determined by the second device based on the respective priorities, the configuration comprising at least one of identifiers associated with a first set of QoE measurements in the at least one QoE measurement that are not to be reported to the second device; or a service type associated with a first set of QoE measurements in the at least one QoE measurement that are not to be reported to the second device.

At 520, the first device determines the reporting of the at least one QoE measurement based on the indication.

In some example embodiments, the first device may receive, from the second device, information about an overload level of a channel between the first and the second devices and determine a threshold priority based on the overload level. If the first device determines that a first set of QoE measurements in the at least one QoE measurement have respective priorities being lower than the threshold priority, the first device may stop or suspend reporting the first set of QoE measurements.

In some example embodiments, if the first device determines that a further overload level of the channel is received from the second device, the first device may determine a further threshold priority based on the further overload level. If the first device determines that the first set of QoE measurements have respective priorities exceeding the further threshold priority, the first device may resume reporting the first set of QoE measurements.

In some example embodiments, the first device may receive further information about a timer for the first device to detect an overload status of a channel between the first and the second devices and perform a detection of the overload status by starting the timer. If the first device determines that the overload status is detected before the time expires, the first device may determine a first threshold priority based on the overload status. If the first device determines that a first set of QoE measurements in the at least one QoE measurement have respective priorities being lower than the first threshold priority, the first device may stop or suspend reporting the first set of QoE measurements.

In some example embodiments, the first device may perform a further detection of the overload status by restarting the timer. If the first device determines that the overload status is detected before the time expires, the first device may determine a second threshold priority based on the overload status, the second threshold priority being higher than the first threshold priority. If the first device determines that a second set of QoE measurements in the at least one QoE measurement have respective priorities exceeding the first threshold priority and lower than the second threshold priority, the first device may stop or suspend reporting the second set of QoE measurements.

In some example embodiments, if the first device determines that the overload status fails to be detected before the time expires, the first device may resume reporting the first set of QoE measurements.

In some example embodiments, the first device may perform at least one of the following based on the respective priorities of the first set of QoE measurements: log results of the first set of QoE measurements or discard results of the first set of QoE measurements.

In some example embodiments, if the first device determines that the reporting of a first set of QoE measurements are resumed, the first device may determine whether histories results of the first set of QoE measurements are logged. If the first device determines that the histories results are logged, the first device may report the histories results to the second device based on the respective priorities of the first set of QoE measurements.

In some example embodiments, if the first device determines that the indication comprises a configuration for reporting at least one QoE measurement determined by the second device based on the respective priorities, the first device may determine, based on the configuration, a first set of QoE measurements in the at least one QoE measurement are not to be reported to the second device and stop or suspend reporting results of the first set of QoE measurements.

In some example embodiments, the first device may perform at least one of the following: log results of the first set of QoE measurements or discard results of the first set of QoE measurements.

In some example embodiments, if the first device determines that the reporting of a first set of QoE measurements are resumed, the first device may determine whether histories results of the first set of QoE measurements are logged. If the first device determines that the histories results are logged, the first device may report the histories results to the second device.

In some example embodiments, if the first device determines that no histories results are logged, the first device may report current results of the first set of QoE measurements to the second device.

In some example embodiments, the first device comprises a terminal device and the second device comprises a network device.

Figure 6:
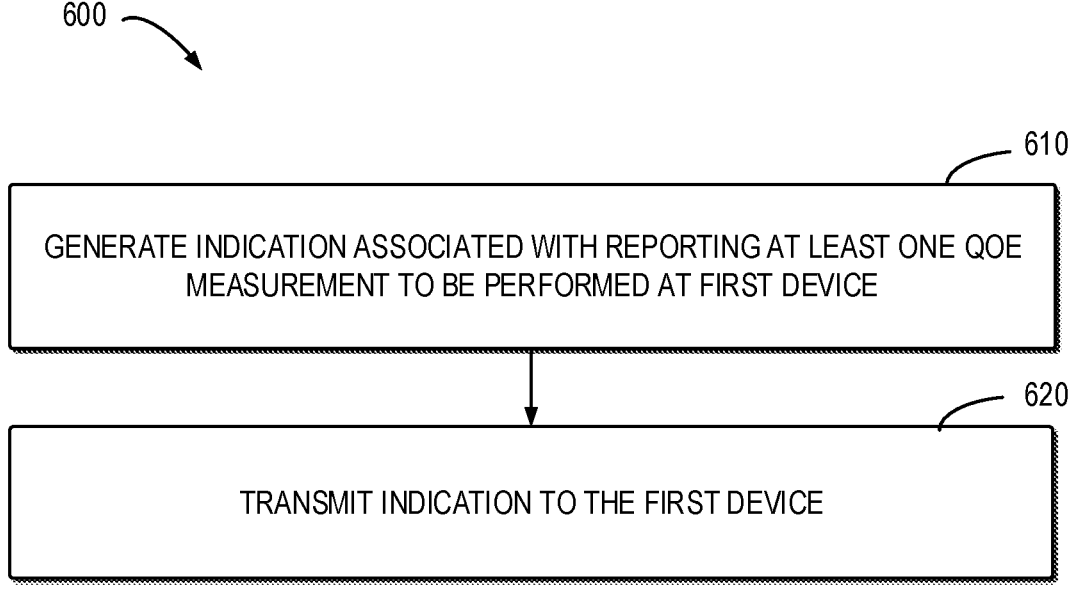
FIG. 6 shows a flowchart of an example method of priority setting for QoE according to some example embodiments of the present disclosure.

FIG. 6 shows a flowchart of an example method 600 of priority setting for QoE according to some example embodiments of the present disclosure. The method 600 can be implemented at the second device 120 as shown in FIG. 1. For the purpose of discussion, the method 600 will be described with reference to FIG. 1.

At 610, the second device generates an indication associated with reporting at least one Quality of Experience, QoE, measurement to be performed at a first device based on respective priorities of the at least one QoE measurement.

In some example embodiments, the second device may obtain the respective priorities of the at least one QoE measurement from at least one of a core network entity or an operation and maintenance entity.

In some example embodiments, the second device may determine the respective priorities of the at least one QoE measurement based on respective service types of the at least one QoE measurement.

In some example embodiments, the second device may transmit information of the respective priorities of the at least one QoE measurement from the second device.

In some example embodiments, the second device may transmit a configuration for reporting at least one QoE measurement determined by the second device based on the respective priorities, the configuration comprising at least one of identifiers associated with a first set of QoE measurements in the at least one QoE measurement that are not to be reported to the second device; or a service type associated with a first set of QoE measurements in the at least one QoE measurement that are not to be reported to the second device.

At 620, the second device transmits the indication to the first device.

In some example embodiments, the second device may transmit, to the first device, information about an overload level of a channel between the first and the second devices.

In some example embodiments, the second device may transmit, to the first device, further information about a timer for the first device to detect an overload status of a channel between the first and the second devices.

In some example embodiments, the first device comprises a terminal device and the second device comprises a network device.

In some example embodiments, an apparatus capable of performing the method 500 (for example, implemented at the UE 110) may comprise means for performing the respective steps of the method 500. The means may be implemented in any suitable form. For example, the means may be implemented in a circuitry or software module.

In some example embodiments, the apparatus comprises means for receiving, from a second device, an indication associated with reporting at least one QoE measurement to be performed at the first device, the indication generated by the second device based on respective priorities of the at least one QoE measurement and means for determining the reporting of the at least one QoE measurement based on the indication.

In some example embodiments, an apparatus capable of performing the method 600 (for example, implemented at the gNB 120) may comprise means for performing the respective steps of the method 600. The means may be implemented in any suitable form. For example, the means may be implemented in a circuitry or software module.

In some example embodiments, the apparatus comprises means for generating an indication associated with reporting at least one QoE measurement to be performed at a first device based on respective priorities of the at least one QoE measurement and means for transmitting the indication to the first device.

Figure 7:
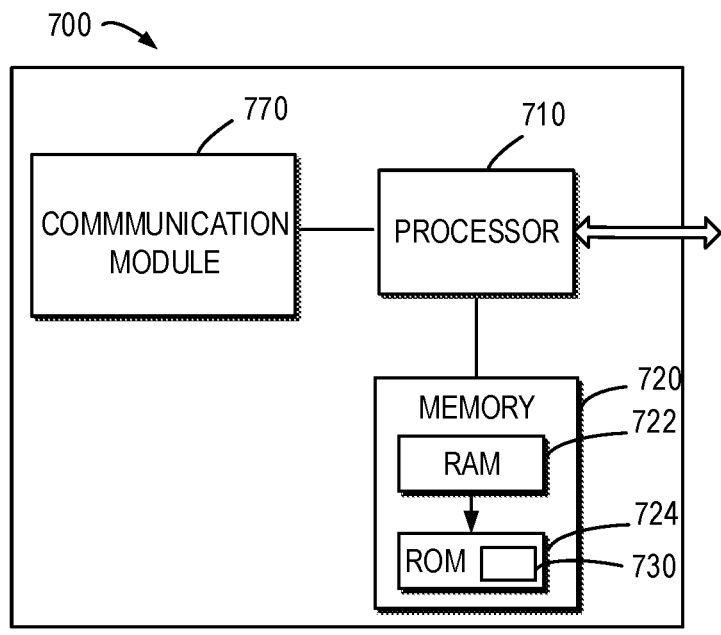
FIG. 7 shows a simplified block diagram of a device that is suitable for implementing example embodiments of the present disclosure.

FIG. 7 is a simplified block diagram of a device 700 that is suitable for implementing embodiments of the present disclosure. The device 700 may be provided to implement the communication device, for example the UE 110 and the gNB 120 as shown in FIG. 1. As shown, the device 700 includes one or more processors 710, one or more memories 740 coupled to the processor 710, and one or more transmitters and/or receivers (TX/RX) 740 coupled to the processor 710.

The TX/RX 740 is for bidirectional communications. The TX/RX 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 720. The processor 710 may perform any suitable actions and processing by loading the program 730 into the RAM 720.

The embodiments of the present disclosure may be implemented by means of the program 730 so that the device 700 may perform any process of the disclosure as discussed with reference to FIGS. 2 to 6. The embodiments of the present disclosure may also be implemented by hardware or by a combination of software and hardware.

Figure 8:
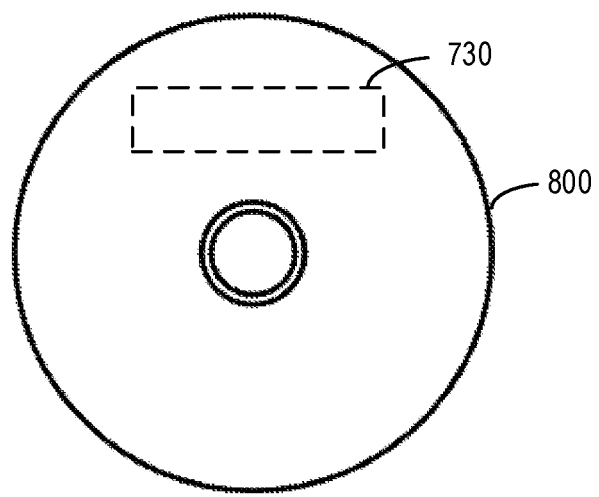
FIG. 8 shows a block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 700 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500-600 as described above with reference to FIGS. 5-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:
at least one processor; and
at least one memory including program code;
the at least one memory and the program code are configured to, with the at least one processor, cause the apparatus at least to:
receive, from a network device, an indication associated with reporting at least one quality of experience measurement to be performed at the apparatus, wherein the indication is generated based on respective priorities of the at least one quality of experience measurement; and
determine the reporting of the at least one quality of experience measurement based on the indication;
wherein the determining of the reporting of the at least one quality of experience measurement based on the indication comprises discarding, based on the respective priorities of the at least one quality of experience measurement, one or more of the at least one quality of experience measurement that has stopped, paused, or suspended reporting.

2. The apparatus of claim 1, wherein the apparatus is caused to receive the indication by:
receiving information of the respective priorities of the at least one quality of experience measurement from the network device.

3. The apparatus of claim 1, wherein the apparatus is caused to receive the indication by:
receiving a configuration for reporting at least one quality of experience measurement determined by the network device based on the respective priorities, the configuration comprising at least one of the following:

identifiers associated with a first set of quality of experience measurements in the at least one quality of experience measurement that are not to be reported to the network device; or
a service type associated with a first set of quality of experience measurements in the at least one quality of experience measurement that are not to be reported to the network device.

4. The apparatus of claim 1, wherein the apparatus is caused to determine the reporting of the at least one quality of experience measurement by:
receiving, from the network device, information about an overload level of a channel between the apparatus and the network device;
determining a threshold priority based on the overload level; and
in accordance with a determination that a first set of quality of experience measurements in the at least one quality of experience measurement have respective priorities being lower than the threshold priority, stopping or suspending reporting the first set of quality of experience measurements.

5. The apparatus of claim 4, wherein the apparatus is further caused to:
perform at least one of the following based on the respective priorities of the first set of quality of experience measurements:
log results of the first set of quality of experience measurements; or
discard results of the first set of quality of experience measurements.

6. The apparatus of claim 4, wherein the apparatus is further caused to:
in accordance with a determination that a further overload level of the channel is received from the network device, determine a further threshold priority based on the further overload level; and
in accordance with a determination that the first set of quality of experience measurements have respective priorities exceeding the further threshold priority, resume reporting the first set of quality of experience measurements.

7. The apparatus of claim 6, wherein the apparatus is caused to resume reporting the first set of quality of experience measurements by:
in accordance with a determination that the reporting of a first set of quality of experience measurements are resumed, determining whether histories results of the first set of quality of experience measurements are logged; and
in accordance with a determination that the histories results are logged, reporting the histories results to the network device based on the respective priorities of the first set of quality of experience measurements.

8. The apparatus of claim 1, wherein the apparatus is caused to determine the reporting of the at least one quality of experience measurement by:
receiving further information about a timer for the first device to detect an overload status of a channel between the apparatus and the network device;
performing a detection of the overload status by starting the timer;
in accordance with a determination that the overload status is detected before the time expires, determining a first threshold priority based on the overload status; and in accordance with a determination that a first set of quality of experience measurements in the at least one quality of experience measurement have respective priorities being lower than the first threshold priority, stopping or suspending reporting the first set of quality of experience measurements.

9. The apparatus of claim 8, wherein the apparatus is further caused to:

perform a further detection of the overload status by restarting the timer;

in accordance with a determination that the overload status is detected before the time expires, determine a second threshold priority based on the overload status, the second threshold priority being higher than the first threshold priority; and in accordance with a determination that a second set of quality of experience measurements in the at least one of quality of experience measurement have respective priorities exceeding the first threshold priority and lower than the second threshold priority, stop or suspend reporting the second set of quality of experience measurements.

10. The apparatus of claim 9, wherein the apparatus is further caused to:

in accordance with a determination that the overload status fails to be detected before the time expires, resume reporting the first set of quality of experience measurements.

11. The apparatus of claim 1, wherein the apparatus is caused to determine the reporting of the at least one quality of experience measurement by:

in accordance with a determination that the indication comprises a configuration for reporting at least one quality of experience measurement determined by the network device based on the respective priorities, determining, based on the configuration, a first set of quality of experience measurements in the at least one quality of experience measurement are not to be reported to the network device; and stopping or suspending reporting results of the first set of quality of experience measurements.

12. The apparatus of claim 11, wherein the apparatus is further caused to:

perform at least one of the following:

log the results of the first set of quality of experience measurements; or discard the results of the first set of quality of experience measurements.

13. The apparatus of claim 11, wherein the apparatus is further caused to:

in accordance with a determination that the reporting of a first set of quality of experience measurements are resumed, determine whether histories results of the first set of quality of experience measurements are logged; and in accordance with a determination that the histories results are logged, report the histories results to the second device.

14. The apparatus of claim 13, wherein the apparatus is further caused to:

in accordance with a determination that no histories results are logged, report current results of the first set of quality of experience measurements to the network device.

15. An apparatus, comprising:

at least one processor; and at least one memory including program code;

the at least one memory and the program code are configured to, with the at least one processor, cause the apparatus at least to:

generate an indication associated with reporting at least one quality of experience measurement to be performed at a user equipment based on respective priorities of the at least one quality of experience measurement; and transmit the indication to the user equipment:

wherein the indication is configured to allow the user equipment to determine reporting of the at least one quality of experience measurement based on the indication, the determining comprising discarding, based on the respective priorities of the at least one quality of experience measurement, one or more of the at least one quality of experience measurement that has stopped, paused, or suspended reporting.

16. The apparatus of claim 15, wherein the apparatus is further caused to:

obtain the respective priorities of the at least one quality of experience measurement from at least one of a core network entity or an operation and maintenance entity.

17. The apparatus of claim 15, wherein the apparatus is further caused to:

determine the respective priorities of the at least one quality of experience measurement based on respective service types of the at least one quality of experience measurement.

18. The apparatus of claim 15, wherein the apparatus is caused to transmit the indication by:

transmitting information of the respective priorities of the at least one quality of experience measurement.

19. The apparatus of claim 15, wherein the apparatus is caused to transmit the indication by:

transmitting a configuration for reporting at least one quality of experience measurement determined by the apparatus based on the respective priorities, the configuration comprising at least one of the following:

identifiers associated with a first set of quality of experience measurements in the at least one quality of experience measurement that are not to be reported to the apparatus; or a service type associated with a first set of quality of experience measurements in the at least one quality of experience measurement that are not to be reported to the apparatus.

20. A method, comprising:

receiving, at a user equipment and from a network device, an indication associated with reporting at least one quality of experience measurement to be performed at the user equipment, wherein the indication is generated based on respective priorities of the at least one quality of experience measurement; and determining the reporting of the at least one quality of experience measurement based on the indication;

wherein the determining of the reporting of the at least one quality of experience measurement based on the indication comprises discarding, based on the respective priorities of the at least one quality of experience measurement, one or more of the at least one quality of experience measurement that has stopped, paused, or suspended reporting.

* * * * *